United States Patent
Yu

(10) Patent No.: US 12,400,499 B2
(45) Date of Patent: Aug. 26, 2025

(54) SMART KEY DEVICE

(71) Applicants: INVENTEC (PUDONG) TECHNOLOGY CORPORATION, Shanghai (CN); INVENTEC CORPORATION, Taipei (TW)

(72) Inventor: Ming Liang Yu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 132 days.

(21) Appl. No.: 18/368,796

(22) Filed: Sep. 15, 2023

(65) Prior Publication Data

US 2025/0078591 A1 Mar. 6, 2025

(30) Foreign Application Priority Data

Aug. 29, 2023 (CN) .......................... 202311101898.7

(51) Int. Cl.
| | |
|---|---|
| *G07C 9/00* | (2020.01) |
| *H02J 7/00* | (2006.01) |
| *H02J 50/10* | (2016.01) |
| *H02J 50/80* | (2016.01) |

(52) U.S. Cl.
CPC ........ *G07C 9/00309* (2013.01); *H02J 7/0048* (2020.01); *H02J 50/10* (2016.02); *H02J 50/80* (2016.02); *G07C 2009/0038* (2013.01); *G07C 2009/00507* (2013.01); *G07C 2009/00587* (2013.01); *H02J 2207/20* (2020.01)

(58) Field of Classification Search
CPC ........ G07C 9/00309; G07C 2009/0038; G07C 2009/00507; G07C 2009/00587; G07C 9/00944; G07C 2009/00769; H02J 7/0048; H02J 50/10; H02J 50/80; H02J 2207/20; H02J 7/00034; H02J 50/20; H02J 50/90; Y02D 30/70; G01C 21/16; G01R 31/382; G01S 13/08
USPC ....................................................... 340/5.72
See application file for complete search history.

(56) References Cited

U.S. PATENT DOCUMENTS

| | | | |
|---|---|---|---|
| 6,291,968 B1* | 9/2001 | Nantz ..................... | H02J 50/12 320/108 |
| 9,134,956 B2* | 9/2015 | Yamashita .............. | B60R 25/40 |
| 9,563,990 B2* | 2/2017 | Khan ...................... | B60R 25/24 |

(Continued)

*Primary Examiner* — Nam V Nguyen
(74) *Attorney, Agent, or Firm* — Maschoff Brennan

(57) ABSTRACT

A smart key device includes a battery, a wireless charging module, a sound output component, a distance measuring module, and a control module, wherein the wireless charging module is electrically connected to the battery, and the control module is electrically connected to the wireless charging module, the sound output component and the distance measuring module. The wireless charging module receives power and provide power to the battery. The sound output component is enabled by a first enable signal to output a sound prompt. The distance measuring module is enabled by a second enable signal to perform distance measurement. The control module includes a Bluetooth transceiver and a microcontroller, wherein the microcontroller generates the second enable signal when the Bluetooth transceiver receives a pairing signal and generates the first enable signal when determining that the measured distance is less than a preset distance.

8 Claims, 3 Drawing Sheets

(56) References Cited

U.S. PATENT DOCUMENTS

| | | | | |
|---|---|---|---|---|
| 10,002,535 B1* | 6/2018 | Hille | | G08G 1/123 |
| 10,027,172 B2* | 7/2018 | Colja | | H02J 50/12 |
| 10,581,601 B2* | 3/2020 | Ramoutar | | H04L 9/0869 |
| 12,063,059 B2* | 8/2024 | Russell | | H04W 4/20 |
| 12,139,103 B2* | 11/2024 | Park | | B60R 25/01 |
| 12,157,434 B2* | 12/2024 | Park | | H04W 4/40 |
| 2011/0115605 A1* | 5/2011 | Dimig | | H02J 50/402 |
| | | | | 340/5.61 |
| 2016/0118839 A1* | 4/2016 | Lee | | H02J 50/80 |
| | | | | 320/108 |
| 2023/0238830 A1* | 7/2023 | Slatnick | | H04B 5/79 |
| | | | | 320/108 |

* cited by examiner

SMART KEY DEVICE

CROSS-REFERENCE TO RELATED APPLICATIONS

This non-provisional application claims priority under 35 U.S.C. § 119 (a) on Patent Application No(s). 202311101898.7 filed in China on Aug. 29, 2023, the entire contents of which are hereby incorporated by reference.

BACKGROUND

1. Technical Field

This disclosure relates to a smart key device.

2. Related Art

Traditional smart keys generally only have the functions of remote locking, remote unlocking and sound prompts after triggering the button.

Traditional smart key usually needs battery replacement and the smart key cannot be used when the battery is out of power. Therefore, when a new battery for replacement is not available, it may cause the problem that the smart key cannot be used for locking or unlocking. In addition, in the process of using the smart key, the user often needs to spend a lot of time looking for the object to be unlocked, which is quite inconvenient.

SUMMARY

Accordingly, this disclosure provides a smart key device.

According to one or more embodiment of this disclosure, a smart key device includes a battery, a wireless charging module, a sound output component, a distance measuring module and a control module, wherein the wireless charging module is electrically connected to the battery, the control module is electrically connected to the wireless charging module, and the sound output component and the distance measuring module. The wireless charging module is configured to receive electric power and provide the electric power to the battery. The sound output component is configured to be enabled by a first enable signal to output a sound prompt. The distance measuring module is configured to be enabled by a second enable signal to perform distance measurement. The control module includes a Bluetooth transceiver and a microcontroller, wherein the microcontroller is configured to generate the second enable signal when the Bluetooth transceiver receives a pairing signal, and generate the first enable signal when determining that a measured distance of the distance measuring module is less than a preset distance.

In view of the above description, the smart key device of the present disclosure can receive electric power through the wireless charging module, so that a smart key with wireless charging function can be realized, and an alternative solution can be provided when a replacement battery is not available. In addition, the smart key device of the present disclosure can provide an object-finding function through cooperative operation of the Bluetooth transceiver, the ranging module, the sound output component and the microcontroller.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
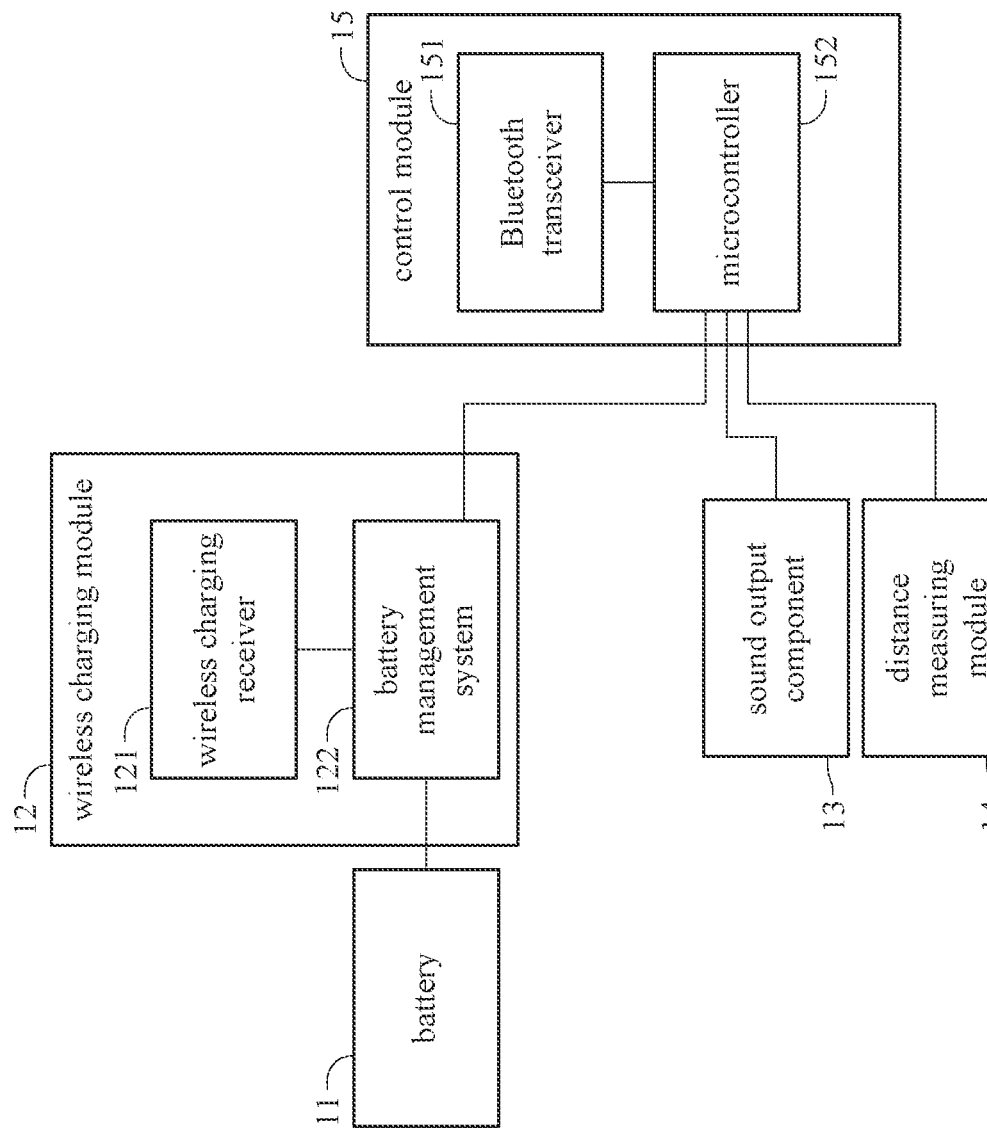
FIG. 1 is a functional block diagram of a smart key device according to an embodiment of the present disclosure.

Please refer to FIG. 1 which is a functional block diagram of a smart key device according to an embodiment of the present disclosure. As shown in FIG. 1, the smart key device 1 includes a battery 11, a wireless charging module 12, a sound output component 13, a distance measuring module 14 and a control module 15. Further, the wireless charging module 12 may include a wireless charging receiver 121 and a battery management system 122; the control module 15 may include a Bluetooth transceiver 151 and a microcontroller 152. The microcontroller 152 can be electrically connected to the battery management system 122, the sound output component 13 and the distance measuring module 14. The wireless charging module 12 can be electrically connected to the battery 11.

The battery 11 is configured to receive and store electric power. The wireless charging module 12 is configured to receive electric power and provide the electric power to the battery 11. Specifically, the wireless charging module 12 can receive electric power from an external power source and transmit the electric power to the battery 11. Further, the wireless charging receiver 121 of the wireless charging module 12 is, for example, a receiver that complies with the Wireless Power Consortium (WPC), and can be used to generate an induced electric field. The battery management system 122 can be electrically connected to the wireless charging receiver 121 to charge the battery 11 based on the induced electric field, and send a reminder signal when the battery is low, fully charged, and when the battery is degraded. Furthermore, the induced electric field is generated through the electric field coupling between the wireless charging module 12 and the external power source.

The sound output component 13 is configured to be enabled by the first enable signal from the microcontroller 152 to output sound prompts. For example, the sound output component 13 may be a sound output device such as a buzzer or a speaker.

The distance measuring module 14 is configured to be enabled by the second enable signal from the microcontroller 152 to perform distance measurement. For example, the distance measuring module 14 may be an ultra-wideband (UWB) chip. Specifically, the distance measuring module 14 can use the time difference between sending and receiving signals with an external communication module based on the same communication protocol as the distance measuring module 14 to obtain the measured distance, which is, the distance between the smart key device 1 and the external communication module.

The control module 15 is configured to be electrically connected to the wireless charging module 12, the sound output component 13, the distance measuring module 14 and the Bluetooth transceiver 151 through the microcontroller 152. Specifically, the microcontroller 152 is configured to generate a second enable signal when the Bluetooth transceiver 151 receives a pairing signal, and generate a first enable signal when it is determined that the distance measured by the distance measuring module 14 is less than a preset distance. Furthermore, the preset controlled (unlock) object of the smart key device 1 can be a device equipped with a Bluetooth module and the aforementioned external communication module, said preset controlled object is especially a vehicle, and the preset controlled object and the smart key device 1 have been paired with Bluetooth in advance. When the microcontroller 152 determines that the Bluetooth transceiver 151 has received the pairing signal (ie, the Bluetooth connection signal) from the preset controlled object, the microcontroller 152 can generate the second enable signal to control the distance measuring module 14 to perform distance measurement. When the microcontroller 152 determines that the distance between the distance measuring module 14 and the preset controlled object is less than the preset distance, the microcontroller 152 can generate the first enable signal to control the sound output component 13 to output a sound prompt. In this way, the smart key device 1 can provide the function of finding a preset controlled object. The control module 15 is implemented with a main control chip, such as a KW45 main control chip.

Figure 2:
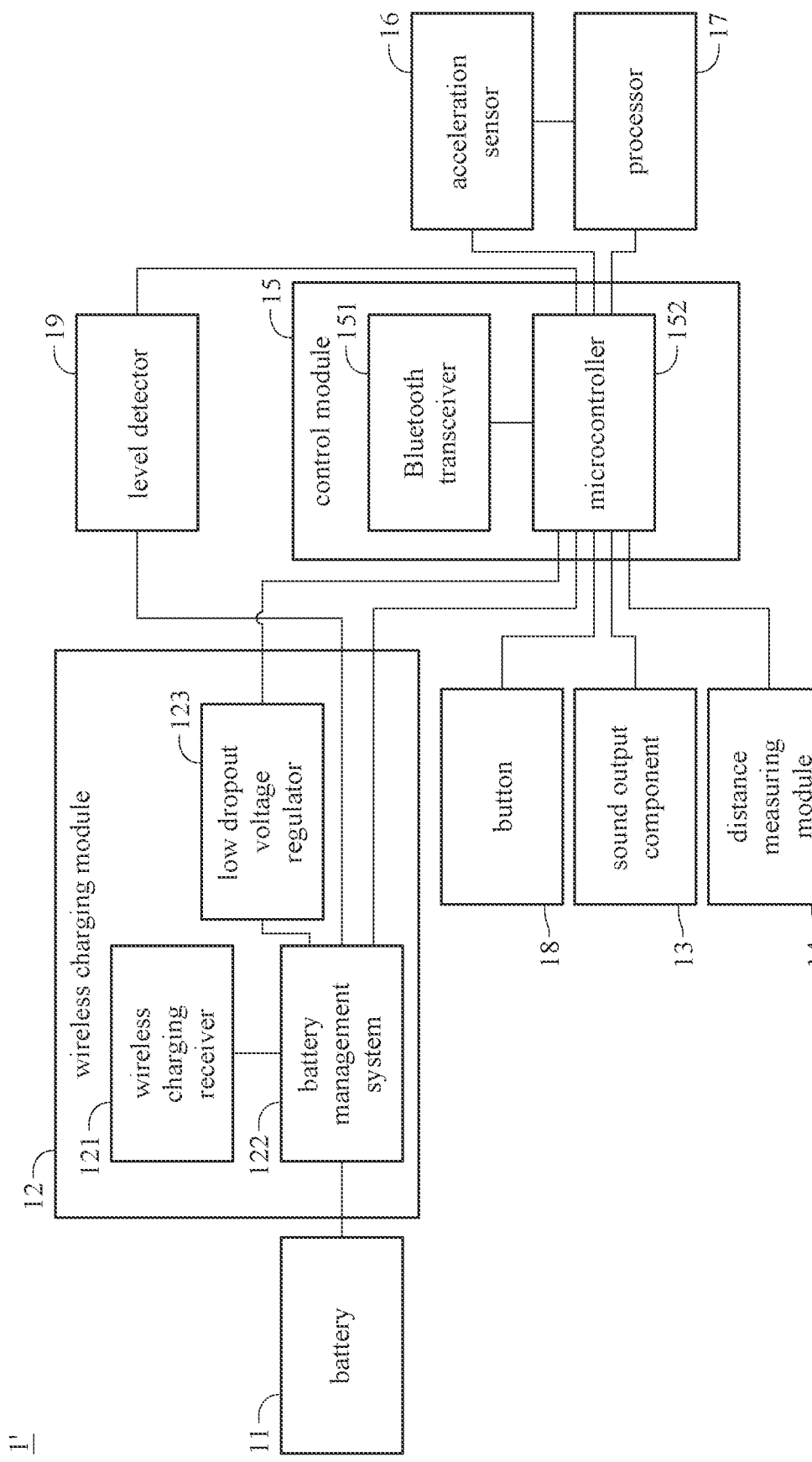
FIG. 2 is a functional block diagram of a smart key device according to another embodiment of the present disclosure.

Please refer to FIG. 2 which is a functional block diagram of a smart key device according to another embodiment of the present disclosure. As shown in FIG. 2, the smart key device 1' includes a battery 11, a wireless charging module 12, a sound output component 13, a distance measuring module 14, a control module 15, an acceleration sensor 16, a processor 17, a button 18 and a level detector 19, wherein the acceleration sensor 16, the processor 17, the button 18 and the level detector 19 are selectively disposed. Furthermore, the wireless charging module 12 can include a wireless charging receiver 121, a battery management system 122 and a low dropout voltage regulator 123, wherein the low dropout voltage regulator 123 is selectively disposed, and the control module 15 can include a Bluetooth transceiver 151 and a microcontroller 152. The implementation device, functions and connection relationships of the above-mentioned battery 11, wireless charging module 12, sound output component 13, distance measuring module 14, control module 15, wireless charging receiver 121, battery management system 122, Bluetooth transceiver 151 and microcontroller 152, are the same as the battery 11, wireless charging module 12, sound output component 13, distance measuring module 14, control module 15, wireless charging receiver 121, battery management system 122, Bluetooth transceiver 151 and microcontroller 152 included in the smart key device 1 shown in FIG. 1, and will not be described in detail herein.

The acceleration sensor 16 is configured to performing sensing to generate an acceleration value. The processor 17 can be, for example, a central processing unit, a graphics processor, a microcontroller, a programmable logic controller, or other processors with signal processing functions, and is configured to be connected to the acceleration sensor 16 and the microcontroller 152. When the processor 17 determines that a change in acceleration value generated by the acceleration sensor 16 is greater than a preset threshold, the processor 17 outputs a wake-up interrupt signal to the microcontroller 152. Specifically, the user can wake up the smart key device 1' by shaking the smart key device 1'.

The button 18 is configured to be electrically connected to the microcontroller 152 and to send the wake-up interrupt signal to the microcontroller 152 after being triggered. Specifically, the outside of the casing of the smart key device 1' may be provided with a button 18 for the user to trigger. After the user presses the button 18, the button 18 will send the wake-up interrupt signal to the microcontroller 152.

The level detector 19 is configured to be electrically connected to the microcontroller 152 and the battery management system 122 and monitor the power level of the battery 11. Specifically, the battery management system 122 can obtain the power level of the battery 11 through the level detector 19, and perform functions such as battery power display, battery low power reminder, battery full power reminder and battery degradation reminder, or the like.

The low dropout voltage regulator 123 is configured to be electrically connected to the battery management system 122 and the microcontroller 152, and convert the voltage of the induced electric field, especially to a voltage of 3.3 volts. Specifically, the low dropout voltage regulator 123 can provide the converted induced electric field to the microcontroller 152.

In the present embodiment, the microcontroller 152 can be further configured to enter a low-power mode when no task instruction is received and the smart key device 1' is determined to remain stationary for a preset time according to the acceleration value generated by the acceleration sensor 16. The task instruction includes an instruction of at least one of a plurality of main tasks and a plurality of sub-tasks, wherein the specific operation of the multiple main tasks and the multiple sub-tasks will be described in the paragraph of the operation steps of the smart key device 1'.

Figure 3:
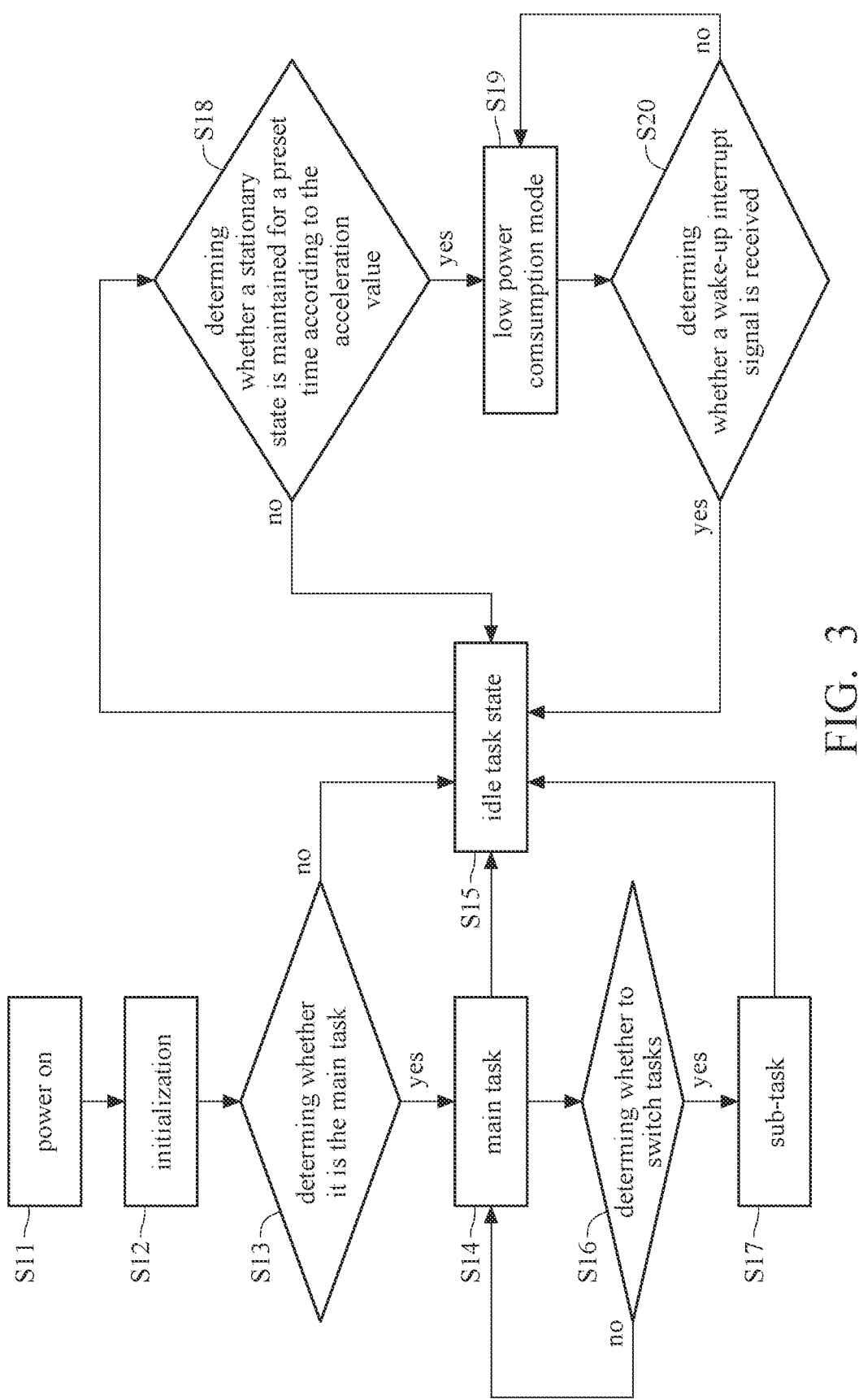
FIG. 3 is a flow chart of the operation of a smart key device according to an embodiment of the present disclosure.

Please refer to FIG. 3 which is a flow chart of the operation of a smart key device according to an embodiment of the present disclosure. As shown in FIG. 3, the operation steps of the smart key device includes steps S11: power on; S12: initialization; step S13: determining whether it is the main task; when the determination result in step S13 is "yes", executing step S14: the main task; when the determination result in step S13 is "No", entering an idle task state (step S15); in the process of executing step S14, executing step S16: determining whether to switch tasks; when the determination result of step S16 is "Yes", executing step S17: the sub-task; when the determination result of step S16 is "No", continuing to execute step S14; when the main task (step S14) or sub-task (step S17) is completed, entering the idle task state (step S15); in the process of being in the idle task state, executing step S18: determining whether a stationary state is maintained for a preset time according to the acceleration value; when the determination result of step S18 is "Yes", entering the low-power mode (step S19); when the determination result of step S18 is "no", continuing to be in the idle task state (step S15); after entering the low-power mode (step S19), executing step S20: determining whether a wake-up interrupt signal is received; when the determination result of step S20 is "yes", entering the idle task state (step S15); and when the determination result of step S20 is "no", the low-power mode is maintained (step S19). The operation steps of the smart key device can be applied to the smart key device 1 shown in FIG. 1 and the smart key device 1' shown in FIG. 2. The operation steps of the smart key device shown in FIG. 3 will be described below using the smart key device 1' shown in FIG. 2 as an example.

In steps S11 and S12, the microcontroller 152 is powered on and initialized. In step S13, the microcontroller 152 determines whether the pre-stored or externally provided task instruction is the main task. Specifically, when the microcontroller 152 determines that it is the main task, the microcontroller 152 executes the main task, and when the microcontroller 152 determines that it is not the main task, the microcontroller 152 enters the idle task state.

In step S14, the microcontroller 152 executes the main task. Specifically, the main task can include Bluetooth-based advertising, scanning, connection and data transmission.

In step S15, the microcontroller 152 is in the idle task state. Specifically, when the microcontroller 152 does not receive a task instruction, the microcontroller 152 is in the idle task state.

In step S16, the microcontroller 152 determines whether to switch tasks. Specifically, the microcontroller 152 can determine whether an instruction to switch tasks is received during the execution of the main task. When the microcontroller 152 determines that an instruction to switch task is received, then the microcontroller 152 executes the sub-task. When the microcontroller 152 determines that the instruction to switch task is not received, then the microcontroller 152 continues to execute the main task. The instruction to switch task may be triggered, for example, by the user through a switching button or user interface of the smart key device 1'.

In step S17, the microcontroller 152 executes the sub-task. Specifically, the sub-task may include processing data according to a preset protocol and outputting a signal corresponding to the data under a preset condition.

In step S18, it is determined that whether the stationary state is maintained for a preset time according to the acceleration value. In one implementation, when the microcontroller 152 determines that the change in the acceleration value generated by the acceleration sensor 16 is not greater than the preset threshold for the preset time, the microcontroller 152 can determine that the stationary state has been maintained for the preset time. In another implementation, when the processor 17 determines that the change of the acceleration value generated by the acceleration sensor 16 is greater than the preset threshold, the processor 17 may output a wake-up interrupt signal to the microcontroller 152. When the microcontroller 152 determines not receiving wake-up interrupt signal from the processor 17 for the preset time, the microcontroller 152 can determine that the stationary state has been maintained for the preset time.

In step S19, the microcontroller 152 enters the low power consumption mode. Specifically, when the microcontroller 152 determines that the change in the acceleration value generated by the acceleration sensor 16 is not greater than the preset threshold for the preset time or does not received a wake-up interrupt signal from the processor 17 for a preset time, the microcontroller 152 enters the low power consumption mode.

In step S20, the microcontroller 152 determines whether a wake-up interrupt signal is received. Specifically, when the microcontroller 152 receives the wake-up interrupt signal from the processor 17 or the button 18, the microcontroller 152 can end the low-power mode and enter the idle task state. When the microcontroller 152 does not receive the wake-up interrupt signal, the microcontroller 152 maintains the low power consumption mode.

In view of the above description, a smart key device of the present disclosure can receive electric power through the wireless charging module, so that a smart key with wireless charging function can be realized, and an alternative solution can be provided when a replacement battery is not available. In addition, the smart key device of the present disclosure can provide an object-finding function through cooperative operation of the Bluetooth transceiver, the ranging module, the sound output component and the microcontroller. In addition, by the two wake-up methods of sensing acceleration to generate acceleration value or pressing a button, the smart key device of the present disclosure can keep the smart key device in a low-power mode to save electric power when the carrier movement is not detected and the user does not trigger it.

What is claimed is:

1. A smart key device, comprising:
    a battery;
    a wireless charging module electrically connected to the battery and configured to receive electric power and provide the electric power to the battery;
    a sound output component configured to be enabled by a first enable signal to output a sound prompt;
    a distance measuring module configured to be enabled by a second enable signal to perform distance measurement;
    an acceleration sensor configured to perform sensing to generate an acceleration value; and
    a control module, comprising:
        a Bluetooth transceiver; and
        a microcontroller electrically connected to the wireless charging module, the sound output component, the distance measuring module and the Bluetooth transceiver, and configured to generate the second enable signal when the Bluetooth transceiver receives a pairing signal, and generate the first enable signal when determining that a measured distance of the distance measuring module is less than a preset distance,
    wherein the control module is configured to enter a low-power mode when no task instruction is received and the smart key device is determined to remain stationary for a preset time according to the acceleration value,
    wherein the task instruction comprises an instruction of at least one of a plurality of main tasks and a plurality of sub-tasks, the plurality of main tasks comprise Bluetooth-based broadcasting, scanning, connection and data transmission, and the plurality of sub-tasks comprise processing the data according to a preset protocol and outputting a signal corresponding to the data under a preset condition.

2. The smart key device of claim 1, wherein the distance measuring module is implemented with an ultra-wideband chip, and the ultra-wideband chip is configured to obtain the measured distance by using a time difference between sending and receiving signals.

3. The smart key device of claim 1, further comprising:
    a processor, connected to the acceleration sensor and the control module, and configured to output a wake-up interrupt signal to the control module when determining that a change in the acceleration value is greater than a preset threshold.

4. The smart key device of claim 1, further comprising:
    a button electrically connected to the control module, and configured to send a wake-up interrupt signal to the control module after being triggered.

5. The smart key device of claim 1, wherein the wireless charging module comprises:
- a wireless charging receiver configured to generate an induced electric field; and
- a battery management system electrically connected to the wireless charging receiver, and configured to charge the battery based on the induced electric field.

6. The smart key device of claim 5, wherein the wireless charging module further comprises:
- a low dropout voltage regulator electrically connected to the battery management system and the control module, and configured to convert a voltage of the induced electric field and provide the induced electric field that is converted to the control module.

7. The smart key device of claim 1, wherein the control module is implemented with a main control chip.

8. The smart key device of claim 1, further comprising:
- a level detector electrically connected to the control module and a battery management system, and configured to monitor a power level of the battery.

\* \* \* \* \*